United States Patent [19]

Chea, Jr.

[11] Patent Number: 4,674,119
[45] Date of Patent: Jun. 16, 1987

[54] WIDE-BAND HIGH VOLTAGE AMPLIFIER FOR TELEPHONE EXCHANGE SUBSCRIBER LINE INTERFACE UTILIZING LOW VOLTAGE CONTROL CIRCUITRY

[75] Inventor: Ramon C. W. Chea, Jr., Monroe, Conn.

[73] Assignee: ITT Corporation, New York, N.Y.

[21] Appl. No.: 598,650

[22] Filed: Apr. 10, 1984

[51] Int. Cl.$^4$ ............................................. H04B 3/00
[52] U.S. Cl. .................................. 379/400; 379/338; 379/340; 379/399
[58] Field of Search .................. 179/16 F, 18 FA, 70, 179/77, 170 NC, 170 D, 175.3 F, 175.3 R, 175.3 A, 78, 79, 80, 81 R, 99 H; 361/152, 153, 155, 156; 307/141, 311, 595; 330/10, 251, 207 A; 363/21, 97; 379/395, 400, 402, 413, 343, 338, 344, 345

[56] References Cited

U.S. PATENT DOCUMENTS

| | | | |
|---|---|---|---|
| 3,172,019 | 3/1965 | Ragonese | 361/153 |
| 3,334,243 | 8/1967 | Cooper | 307/595 |
| 4,059,807 | 11/1977 | Hamada | 330/10 |
| 4,071,877 | 1/1978 | Stewart et al. | 361/152 |
| 4,145,721 | 3/1979 | Beaudouin et al. | 358/213 |
| 4,306,122 | 12/1981 | Nijman et al. | 179/170 NC |
| 4,315,106 | 2/1982 | Chea, Jr. | 179/16 F |
| 4,357,495 | 11/1982 | Sweet et al. | 179/77 |
| 4,415,777 | 11/1983 | Agnew | 179/170 NC |
| 4,490,580 | 12/1984 | Nagashima | 179/18 FA |
| 4,546,421 | 10/1985 | Bello et al. | 363/21 |

Primary Examiner—Gene Z. Rubinson
Assistant Examiner—R. Vaas
Attorney, Agent, or Firm—Peter C. Van Der Sluys

[57] ABSTRACT

A wide band high voltage and high power amplifier is particularly useful for telephony applications. The amplifier employs a flyback converter with the capacitor storage element coupled across the line. The subscriber line is characterized in having a definite load impedance which impedance is in parallel with the storage capacitor of the flyback converter. The subscriber lines are monitored by a differential amplifier which provides a single-ended output indicative of the levels across the lines. This output is summed with the input signal to develop an error signal. The input signal to the line circuit is the particular signal of concern such as ringing, the voice signal and so on. The error signal is supplied as one input to a comparator having another input coupled to a triangular reference waveform. The output of the comparator provides a pulse width modulated waveform where the width of the pulses are indicative of the error signal. These pulses are applied to a transistor coupled to the primary winding of the transformer associated with the flyback converter to enable flyback operation during the pulse and hence to transfer energy to the storage capacitor as a function of the error signal.

16 Claims, 7 Drawing Figures

WIDE-BAND HIGH VOLTAGE AMPLIFIER FOR TELEPHONE EXCHANGE SUBSCRIBER LINE INTERFACE UTILIZING LOW VOLTAGE CONTROL CIRCUITRY

BACKGROUND OF THE INVENTION

This invention relates to a wide-band amplifier particularly adapted for use as an amplifier in a telephone line circuit.

In many prior art telephone exchange systems, one employed the use of electromechanical devices such as relays or stepping switches to make a connection between one subscriber line and another. In many such systems the interface between the subscriber loop or line circuit and the telephone exchange included an audio transformer by which the DC talk current to the subscriber loop is fed via two split windings on the primary of the transformer with two feed resistors in series and the AC voltage is coupled to the circuit via the secondary winding.

The ring voltage was applied via a common generator which served a group of subscriber loops or line circuits and which generator was coupled to each of the line circuits via an electromechanical relay. This approach is still widely employed in switching systems and essentially resulted in a reliable circuit based on the available technology of the time.

As one will understand, the electromechanical relay as well as the audio transformer are well known and extremely reliable components. As indicated, the prior art is replete with such circuits, and see for example a text entitled *Transmission Systems for Communications* by Bell Telephone Laboratories, Inc., 3rd edition, 1984.

As one can ascertain, a major disadvantage of these prior art techniques was the use of the audio transformer which as one will understand is a relatively large and bulky circuit component. Another problem, as will be explained, is the use of the common ring generator which also represented a large circuit component which required a relatively large amount of space and power consumption. As the telephone art progressed, there have been many examples of telephone exchanges or telephone systems which employ digital switching techniques and hence essentially in such switching systems, components as relays were replaced by semiconductor components. Along with these advances and the wide spread employment of semiconductor technology, there has been significant reductions in the physical size, the power requirement, and the cost and the overall performance of the line circuit. Hence line circuit as employed in a digital switching system have been implemented using integrated circuit techniques, and therefore, such circuits have resulted in substantial improvements over the line circuits employed with electromechanical devices.

For an example of such improved line circuits reference may be had to U.S. Pat. No. 4,315,106 entitled APPARATUS FOR REGULATING CURRENT SUPPLIED TO A TELEPHONE LINE SIGNAL OF THE TYPE EMPLOYED IN DIGITAL TELEPHONE SYSTEMS issued on Feb. 9, 1982 to R. C. W. Chea, Jr. and assigned to the assignee herein and incorporated herein by reference.

Reference is also made to U.S. Pat. No. 4,387,273 entitled SUBSCRIBER LINE INTERFACE CIRCUIT WITH IMPEDANCE SYNTHESIZER issued on June 7, 1983 to R. C. W. Chea, Jr. and assigned to the assignee herein and incorporated herein by reference. Such patents involve various techniques which relate to the implementation of line circuits as used in digital switching systems.

Reference is also made to U.S. Pat. No. 4,349,703 entitled PROGRAMMABLE RING SIGNAL GENERATOR issued on Sept. 14, 1982 to R. C. W. Chea, Jr. and assigned to the assignee herein and incorporated herein by reference. This patent in particular describes an improved ringing circuit which is particularly suitable for digital switching systems. In the circuit the energizing and de-energizing of the ring circuit is programmably controlled to provide for either hardware or software generation of ringing and other signal voltages. The patent also describes a digital implementation of a complete ringing circuit without the use of bulky transformers and other components. In spite of the techniques as disclosed in the above noted patents, the present solid state implementation of the line interface circuit has excluded the ringing function due to the very high voltage requirement.

In present day telephone systems, when a ringing signal is applied to a line circuit, it exhibits a voltage level of 200 volts or more in order to operate a bell ringer which is associated with many telephone subsets. This very high voltage requirement was not compatible with conventional integrated circuit techniques and hence the components employed in integrated circuits did not possess the necessary voltage requirements to handle such a large operating signal.

It is, of course, understood that the prior art being cognizant of the problem offered various circuit techniques to solve the same. For example, in a co-pending patent application entitled TELEPHONE LINE CIRCUIT AND SYSTEM filed Jan. 10, 1983 as Ser. No. 456,638 by R. C. W. Chea, Jr. et al and assigned to the assignee herein, now U.S. Pat. No. 4,456,991, there is described an implementation to the ringing problem which utilized an 80 volt bipolar semiconductor circuit which was capable of operating directly from the telephone exchange battery. U.S. Pat. No. 4,456,991 is incorporated herein by reference.

As is also well known, most telephone exchanges will supply a 50 volt DC signal to a telephone subset via the line circuit. This DC signal is furnished via a battery at the telephone exchange and is used to operate the line circuit and the subset. As one can ascertain from the above noted application, while the circuit described can operate from the telephone exchange battery, it was not able to directly handle the ringing voltage. Furthermore, the components in a line circuit must also provide protection against damage by short circuit, power cross and surge transient voltages such as those voltages produced by lightning and other types of interference. In order to protect a line circuit from damage due to such phenomena, one was forced to utilize additional components which served to increase the cost of the line circuit. Another important factor is that the line circuit should optimumly be designed so that a minimum of bias current is drawn from the exchange battery to thereby avoid a high idle high current dissipation. As one can ascertain, the number of line circuits in a telephone switching system is a function of the number of subscribers which in a large system may exceed 100,000 or more. Therefore, any reduction in power dissipation of the line circuit allows for a substantial reduction in operating costs in regard to the switching system.

It is, therefore, an object of the present invention to design a wide band, high voltage and high power amplifier which amplifier is suitable for supplying DC talk current, coupling of AC voice and high frequency metering signals and to provide a ringing voltage to the associated subscriber loops in a telephone exchange.

As will be explained, the amplifier to be described employs a flyback converter which enables superior operation. Essentially, a primary object of the present invention is to provide an operational amplifier which is suitable for interface application between the subscriber loop and the telephone exchange. Such an amplifier must possess high voltage and high power operation to enable the amplifier to implement the ringing function of the line interface circuit. The amplifier must be a wide band device having a high slew rate and a high power bandwidth factor. In conjunction with the above characteristics, the amplifier must be able to supply talk current to the subscriber loop while exhibiting low output impedance and, in general, must be a reliable and rugged device which will enable protection against short circuit, power cross and surge transients. The amplifier structure, as will be explained, can be implemented using standard integrated circuit technology where the design will eliminate the need for high voltage integrated circuit components and hence substantially reduce the cost of the line circuit while increasing the reliability and operating performance of the same.

BRIEF DESCRIPTION OF THE PREFERRED EMBODIMENT

A wide band, high voltage amplifier for supplying input signals to a two-wire line, with said line characterized in exhibiting a definite load impedance, comprising a storage capacitor coupled across said two-wire line, a flyback converter having a transformer with primary and secondary windings, with said secondary winding coupled via a unidirectional conducting device to said storage capacitor, and switching means coupled in series with said primary winding, a means coupled across said two-wire line to provide an output signal indicative of the signal across said line, summing means having one input responsive to said output signal and another input responsive to an input signal for application to said line, said output of said summing means providing an error signal indicative of the difference in said two signals applied to said inputs, means having one input responsive to said error signal and another input responsive to a repetitive reference signal to provide at an output a repetitive pulse signal having a pulse width indicative of the magnitude of said error signal and means for applying said repetitive pulse signal to said switching means to cause said flyback converter to transfer energy to said two-wire line according to the magnitude of said error signal as manifested by the width of said pulse signal.

DETAILED DESCRIPTION OF THE INVENTION

Figure 1:
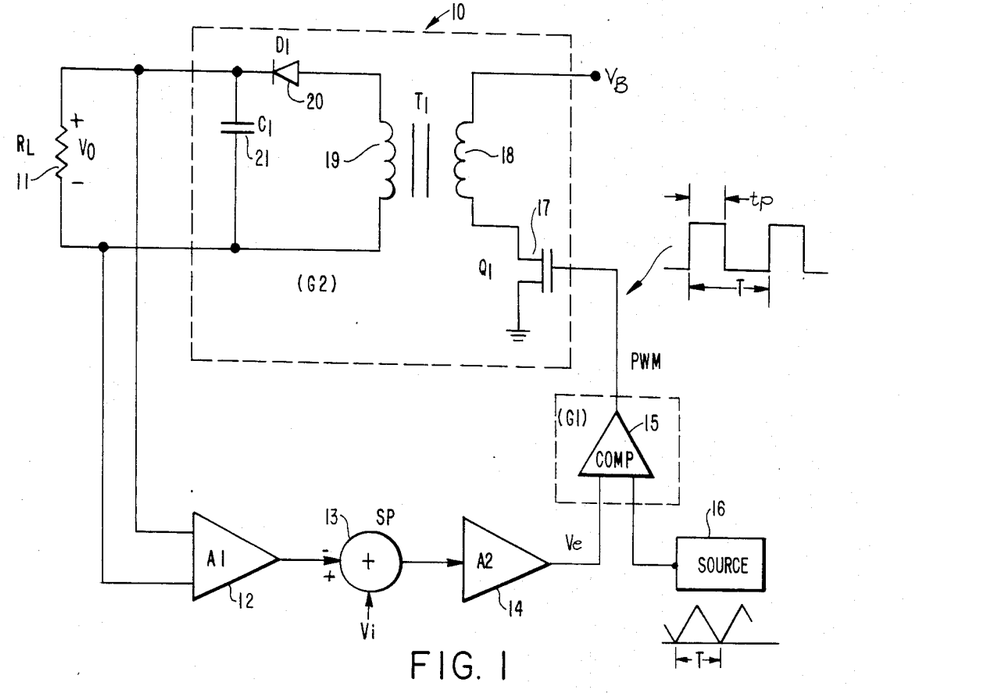
FIG. 1 is a simplified schematic diagram of a wide band high voltage amplifier according to this invention.

Referring to FIG. 1, there is shown a simplified schematic diagram of an amplifier circuit utilizing a flyback converter according to this invention.

The flyback converter 10 is a well known circuit arrangement and has been employed in various applications. Flyback converter circuitry has been employed in low frequency applications such as in power supply circuits using dc/dc converters. The flyback converter has also been used in telephone line circuits and in implementing ringing generators employed in telephone exchanges such as certain of the circuits depicted in U.S. Pat. Nos. 4,315,106 and 4,349,703 as indicated above.

Essentially, the flyback converter has been used in applications utilizing low frequency signals. The flyback converter circuit is a fairly rugged circuit which provides some highly desirable characteristics in regard to a balanced output, high isolation and high voltage and high power capabilities. In any event, a primary problem with the flyback converter has been the bandwidth and the associated stability problem. The bandwidth/stability problem is compounded due to the highly complex characteristics and requirements necessitated by a subscriber line circuit as employed in the telephone exchange. Essentially, a subscriber line can be characterized as being a resistive impedance which resistance is a function of the length of the subscriber line. As will be explained, the amplifier according to this invention solves the bandwidth stability problem by incorporating the resistive characteristics of the subscriber loop as an intrinsic element in the amplifier design.

Thus referring to FIG. 1, there is shown an impedance 11 designated as $R_L$ which impedance represents the subscriber loop or the subscriber line. A flyback converter 10 is coupled to the subscriber line. An amplifier 12 which is a buffer amplifier has one input terminal coupled to one side of the subscriber line and the other input terminal coupled to the other side of the subscriber line. The output of amplifier 12 is coupled to one input of a summer 13. Another input to the summer 13 is designated $V_i$ and is the input signal for the line circuit. Thus the signal $V_i$ may constitute the ringing signal, the talk signal or a high frequency metering signal. Such signals as supplied to line circuits are well known.

The output of the summer is coupled to the input of a second amplifier 14 which, as will be explained, provides gain and frequency shaping for the line circuit. The output of amplifier 14 is coupled to one input of a comparator 15. Another input to comparator 15 is coupled to a repetitive reference source 16 which, as will be explained, generates a triangular wave shape used as a reference for the comparator. The output of the comparator 15 is coupled to the gate electrode of FET 17. The FET 17 has its source and drain electrodes coupled in series with winding 18 of a transformer $T_1$ which is part of the flyback converter. The winding 19 of transformer $T_1$ has one terminal coupled to the anode of a diode 20 with the cathode of the diode 20 coupled to one subscriber line.

A capacitor 21 is shunted across the subscriber line. As indicated, the subscriber loop is represented by the resistor 11 or load $R_L$ which is indicative of the loop length dependent resistance. As will be explained, a main concept which is implemented by the present invention is that the loop impedance as resistor $R_L$ is utilized as an intrinsic element in the overall design of the amplifier.

In order to fully understand the operation of the circuit of FIG. 1, it is believed that a brief description of each of the elements would be warranted.

Essentially, as indicated, the flyback converter 10 as included within the dashed lines is a relatively standard component. In the analysis of the flyback converter 10, the FET 17 operates as a switch which transfers energy via the pulse transformer $T_1$ having windings 18 and 19. The capacitor 21 functions as an energy storage element with $R_L$ as indicated being the load resistance. It is noted that $R_L$, while mainly resistive, can include a reactive component as well.

As shown in FIG. 1, the comparator 15 which operates as a pulse width modulator provides a pulse width output where the width of the pulse $t_p$ is a function of the error voltage developed by the circuit, as will be explained. During the time $t_p$ energy is stored in the primary of the transformer $T_1$. The capacitor 21 and the load resistor $R_L$ are isolated by the action of diode 20 for this period. Thus the equivalent circuit during this period includes the winding 18 which is in series with the voltage $V_B$. The FET 17 is biased on during the time $t_p$, thus coupling the source $V_B$ to ground via the winding 18. Hence during this time, energy is stored in the primary winding 18 of the transformer. At the end of the period $t_p$, the FET is biased off, and the diode 20 conducts due to the flyback action of the transformer, and hence the energy stored in the primary is transferred to capacitor 21 and load $R_L$.

Due to the operation as explained above, the flyback converter is associated with a transfer function designated as $G_2$. It can be shown mathematically that the transfer function of the flyback converter is equal to:

$$G_2 = \frac{V_o}{t_p} = \left( \frac{\alpha}{2} \frac{R_L}{T \cdot L_p} \right)^{\frac{1}{2}} \cdot V_B$$

Where
$G_2$ = transfer function of the flyback converter 10.
$\alpha$ = The efficiency factor of the circuit and is a constant.
$V_o$ = Voltage across $R_L$
$L_p$ = Inductance of winding 18.
$T$ = Repetition rate of triangular waveform to comparator 15.

The comparator 15 is basically a pulse width modulator. As shown in FIG. 1, one input to the comparator is derived from the source 16 which provides a triangular waveform. A Sawtooth waveform could be employed as well and the repetition rate T basically determines the operating frequency of the pulse width modulator. The signal emanating from amplifier 14 designated as $V_e$ is also a time dependent signal and is at a lower frequency than the frequency of the triangular waveform and can be considered to be a constant over the period T.

The output of the comparator 15 is a pulse as shown in FIG. 1 of width $t_p$ which is a function of the value of the voltage $V_e$ from amplifier 14 with respect to the triangular waveform voltage. The comparator 15 also has a transfer function $G_1$ which is calculated to be:

$$G_1 = t_p/V_e = T/V_a \text{ or } t_p = G_1 V_e = (V_e/V_a)T$$

Where
$V_a = S_a \cdot t_a$
$S_a$ = Slope of the triangular waveform
$t_a = T/2$.

As can be seen from the above equations, the width or time duration $t_p$ is a function of the voltage $V_e$ from amplifier 14. In regard to the remaining components shown in FIG. 1, it is seen that amplifier 12 also designated as $A_1$ is basically a signal conditioning device which senses the voltage across the subscriber line or the voltage across resistance $R_L$. This voltage is fed into one input of the summing circuit 13. The voltage is sometimes referred to as the feedback factor and may also be frequency dependent.

The function of the summer ($S_p$) 13 is to algebraically add the feedback signal from amplifier 12 to the input signal $V_i$ which produces a signal output representing the difference of the two signals which is the error signal. The output from the summer which contains the error signal is coupled to the input of amplifier 14 ($A_2$) which amplifier shapes the frequency response of the feedback loop.

As can be seen from FIG. 1, the load resistor $R_L$ which essentially is the resistance of the subscriber line is the DC load for the circuit and is also the gain element of the amplifier G2. Furthermore, the combination of $R_L$ and capacitor 21 is a dominant pole in the frequency response of the amplifier.

Figure 2:
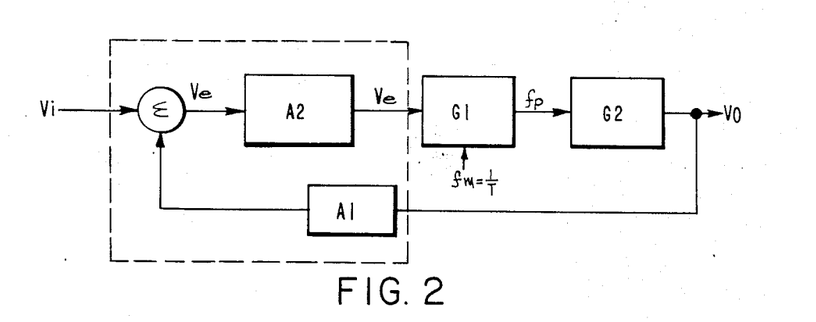
FIG. 2 is a block diagram showing a large signal equivalent model for the amplifier.

It is a major aspect of the present invention to incorporate the load impedance of the subscriber line as a gain element of the amplifier. In order to preserve the necessary relationships of the line resistance in conjunction with the circuit, reference is made to FIG. 2. In FIG. 2 there is a block diagram representation of the circuit of FIG. 1 so that an analysis of the circuit can be had according to feedback control theory. The transfer function shown enclosed by the dashed lines represents the transfer functions of the summer, the error amplifier, and the shaping amplifiers as $A_1$ and $A_2$. Thus the loop gain function can be derived from FIG. 2 as follows:

$$\text{Loop Gain} = G_1 G_2 A_2 A_1 = \left( \frac{T}{V_a} \right) \left( \frac{\alpha}{2} \frac{R_L}{TL_p} V_B^2 \right)^{\frac{1}{2}} \cdot A_1 A_2$$

where $\alpha$ = efficiency factor of the switching converter.

The loop gain function as indicated above is employed to define and to analyze the large signal, steady state behavior of the amplifier. Thus as seen from the equation, the loop gain of the amplifier is dependent upon the load $R_L$ which is the effective impedance of the subscriber line. Thus a key point of the invention is that the load resistor itself is an element of the amplifier design. For telephony application, the values of $R_L$ between 100 ohms and 3,000 ohms are of particular interest wherein these values represent the length of the subscriber loop in the OFF HOOK condition.

Figure 2A:
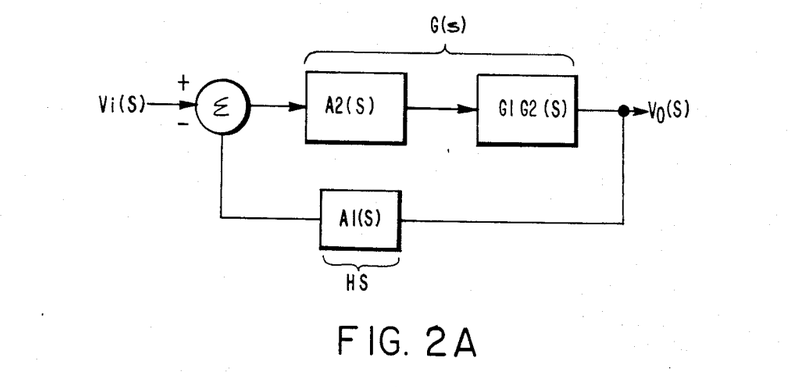
FIG. 2A is a block diagram showing a small signal equivalent model for the amplifier.

Referring to FIG. 2A, there is shown a small signal equivalent model of the wideband amplifier circuit depicted in FIG. 1. Essentially, the transfer functions of each of the modules, as for example amplifiers 12 and 14, as well as the comparator and flyback converter are designated by the same transfer functions as given in FIG. 2. The letter "s" is employed to indicate small signal operation. Based on a small signal analysis of the amplifiers, the following equations are valid:

$$V_o(s) = \frac{A_2(s)G_1G_2(s)}{1 + \underbrace{A_1(s)A(s)G_1G_2(s)}_{\text{LOOP GAIN}}} V_i(s) = \frac{G(s)}{1 + \underbrace{H(s)G(s)}_{\text{LOOP GAIN}}} V_i(s)$$

For frequency stability analysis, the loop-gain expression is used.

Expressions for $A(s)$, $G_1 G_2(s)$ and $K_z$ having following forms:

$$A_2(s) = k_1 \frac{\left(1 + \frac{s}{\omega_1}\right)}{\left(1 + \frac{s}{\omega_2}\right)}$$

where $k_1$ = constant, $\omega_1 > \omega_2$ $$G_1G_2(s) = gm \frac{k_3}{\left(1 + \frac{s}{\omega_0}\right)}$$

where $gm$ = constant, $k_3$ and $\omega_0$ are load dependent parameters

This is valid for frequency $<<$ fm, the PWM frequency $$k_3 = \frac{T}{V_a}$$

$$gm = \left(\frac{\alpha}{2} \frac{R_L}{T} \frac{V_B^2}{L_p}\right)^{\frac{1}{2}}$$

$$\omega_0 = \frac{1}{R_LC_1}$$

According to the small signal analysis of the amplifier, it is seen that the frequency representation as well as the general gain response of the amplifier is also dependent upon the load impedance of the line.

Figure 3:
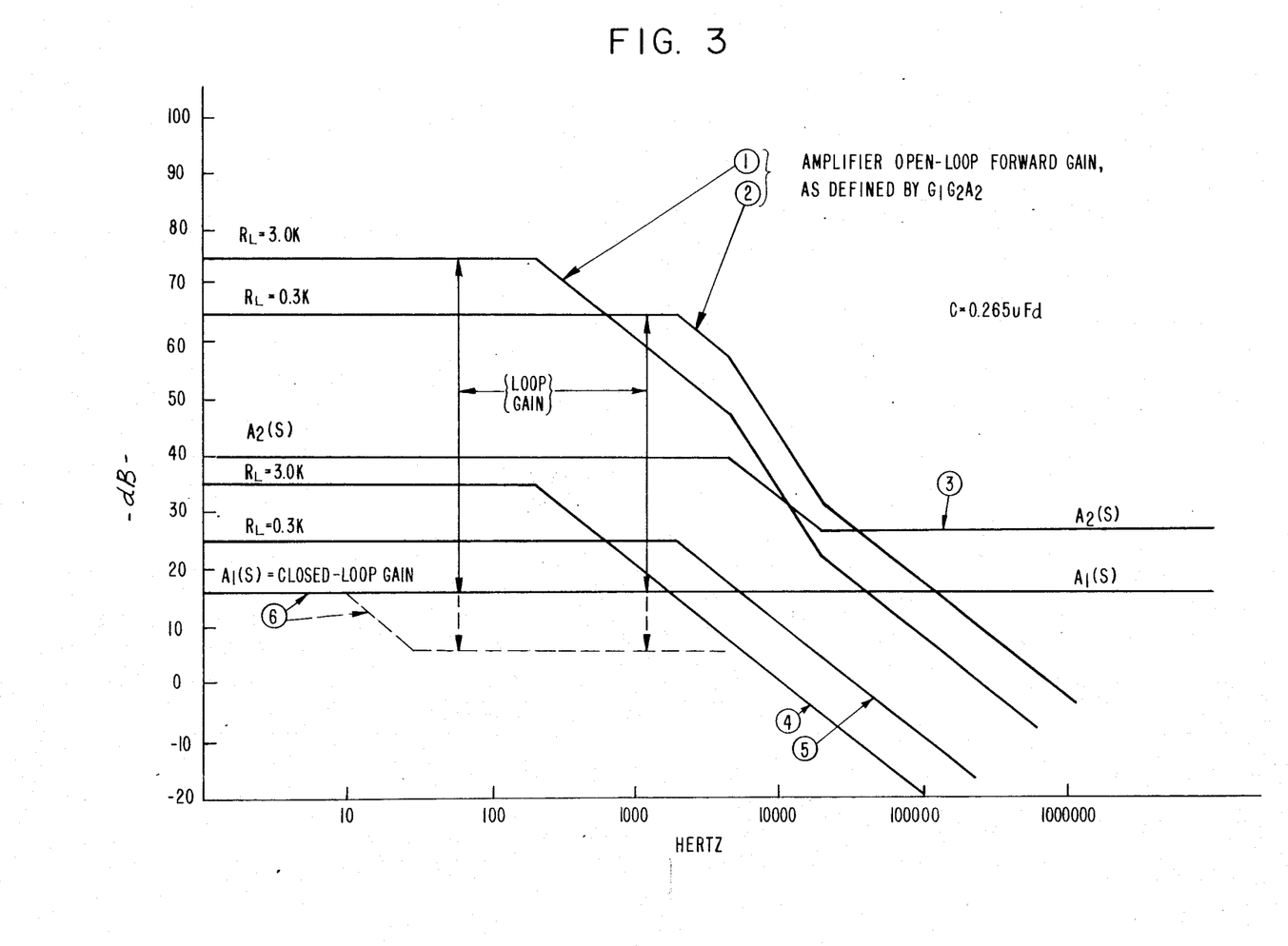
FIG. 3 is a series of curves depicting the frequency characteristics of the amplifier for different load conditions.

Referring to FIG. 3, there is shown a series of curves which illustrates the dependency of the frequency representation of the amplifier on the DC load $R_L$. Curves 1 and 2 are the open loop forward amplifier gain frequency characteristics for $R_L$ equal to 3,000 ohms and 300 ohms respectively. Curve 3 is the frequency representation of amplifier 14 and is selected to shape the frequency of the overall circuit to meet stability requirements.

Curves 4 and 5 illustrate the dependency of the dominant pole on the load resistance $R_L$, and it is defined by the combination of $R_L$ and $C_1$. Curve 6 is the desired closed loop gain frequency of the amplifier as defined by $A_1$. The dotted line of curve 6 is to illustrate that this feature can also be frequency dependent. The loop gain is defined to be the difference between the open loop gain and the closed loop gain on the semi-log scale employed for FIG. 3.

Essentially, the design objective for the amplifier is to insure a maximum loop gain of 34 dB at 3.0 KHz for proper operation in the analog voice band. The 0 dB cross-over frequency for the loop gain is selected to be approximately ½ of the pulse width modulator frequency to minimize its impact on the overall frequency behavior of the amplifier. It is, of course, understood that a main factor in determining the frequency response of the amplifier is inherent in the proper selection of responses for the transfer function of amplifiers $A_1$ and $A_2$.

Figure 4:
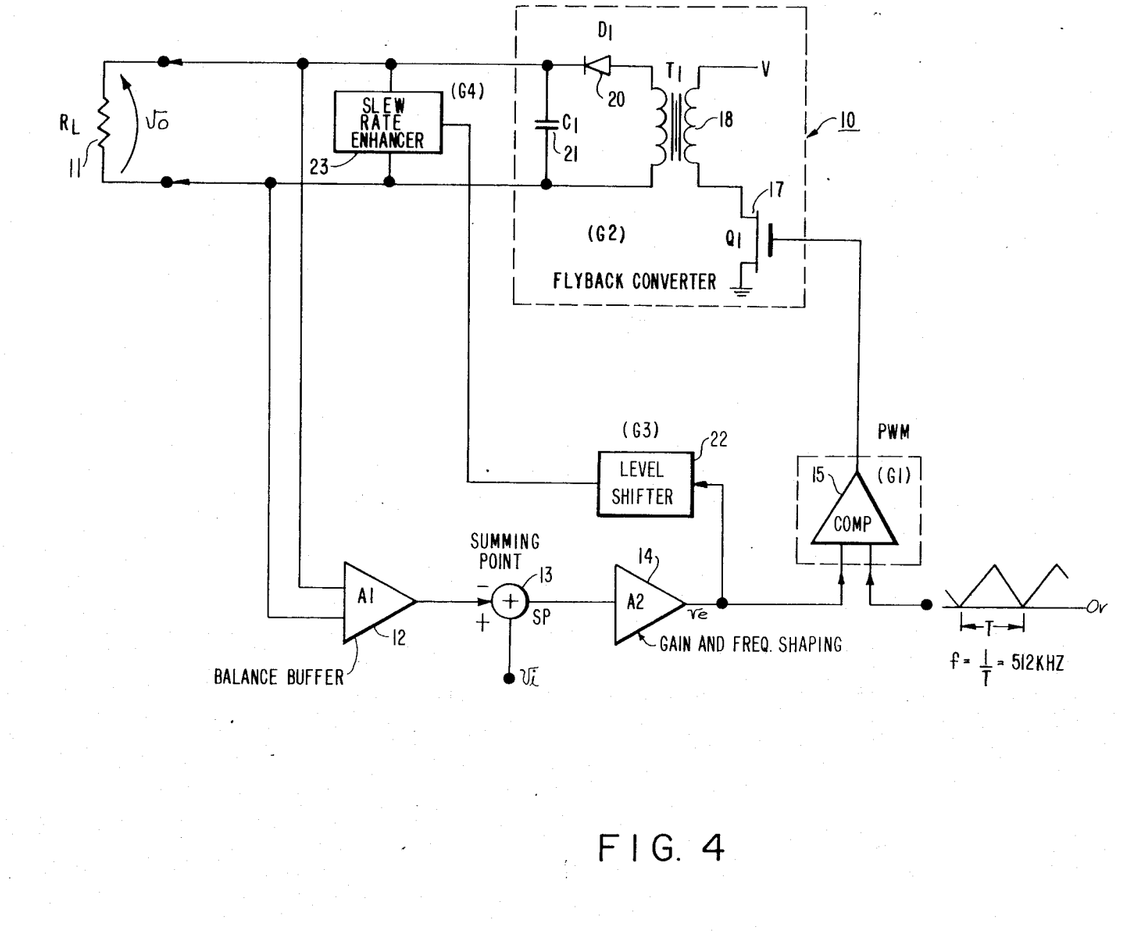
FIG. 4 is a block diagram showing the amplifier incorporating a slew rate enchancer.

There may be certain applications which require a higher slew rate. Essentially, the slew rate of an amplifier is defined as the maximum rate of change of the output voltage with respect to time. In order to obtain an improved slew rate of the wideband high voltage amplifier, reference is made to the circuit of FIG. 4 which essentially includes a level shifter 22 coupled to a slew rate enhancer circuit 23. The slew rate enhancer 23, as will be explained, is controlled by the error signal $V_e$ appearing at the output of amplifier 14 via the level shifter 22. As will be explained, the slew rate enhancer 23 is normally off in the high impedance state as when the error signal $V_e$ is positive with respect to ground. The enhancer 23 is turned on proportionately as $V_e$ goes negative. In FIG. 4 the same reference numerals have been employed for similar components. As will be explained, the amplifier configuration as shown in FIGS. 1 and 4 permits the line circuit to operate with high voltage and high power capability. The amplifier can handle ringing voltage which is a 200 volt signal as well as voice band signals, remote metering signals and DC talk current. The amplifier provides high voltage operation without the need for a high voltage supply for biasing purposes as employed in a conventional amplifier.

This characteristic results in high efficiency operation in regard to power. It is, of course, understood that for conventional amplifier design, in order to provide a signal of 200 volts, a power supply of 200 volts or greater is required. The design provides an extremely rugged amplifier which is capable of protecting against faults such as short circuit, power cross, and surges. The output of the amplifier provides a balanced output which, therefore, provides good isolation between the electronic ground and the subscriber loop. In the amplifier the load of the line itself is an intrinsic element of the amplifier design and hence contributes directly to the gain and frequency behavior of the amplifier.

As one can aascertain from FIG. 1, the major components of the invention such as amplifiers $A_1$, $A_2$, the summer and the comparator are all implemented by low voltage integrated circuits. The remaining components such as transistor 17 are discrete components with transistor 17 preferably being a high voltage MOS transistor. Since the high voltage amplifier can handle the ringing voltage directly, the use of the high voltage amplifier will eliminate the ring generator as well as the ring access relay to, therefore, improve system performance.

Figure 5:
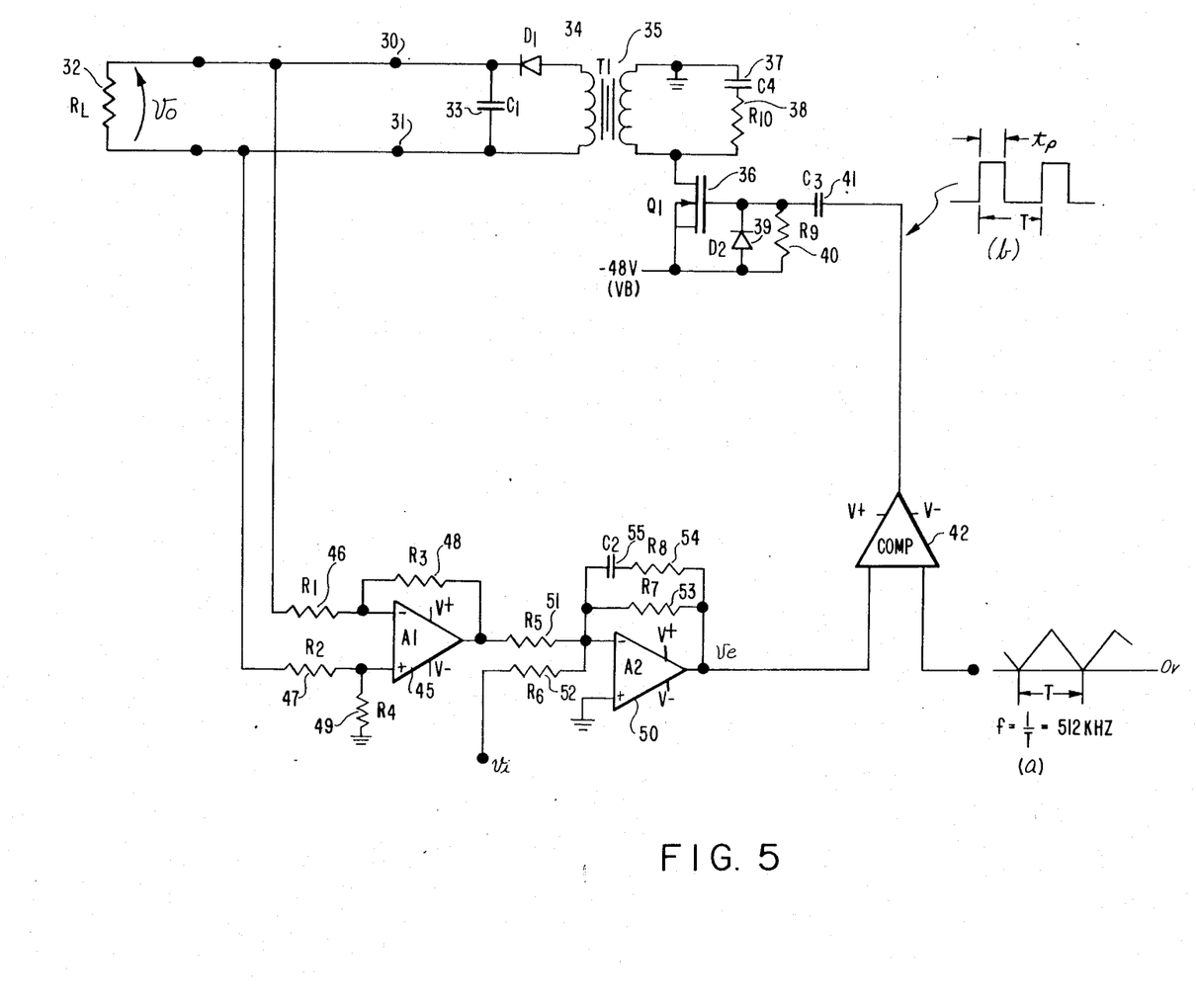
FIG. 5 is a detailed schematic diagram depicting the amplifier of FIG. 1.

Referring to FIG. 5, there is shown a detailed circuit diagram depicting the structure of FIG. 1 in greater detail. As seen in FIG. 5, a subscriber line is depicted by wires 30 and 31 and its impedance is represented by the load impedance $R_L$, 32. The capacitor 33 which is the storage element for the flyback converter is coupled across the wires 30 and 31. The diode 34 and the transformer 35 operate in conjunction with the FET transistor 36 to form the basic elements required for flyback action Capacitor 37 appears in series with resistor 38 across the primary winding of transformer 35 and serves as a damper circuit to prevent high voltage inductive spikes from causing voltage breakdown of transistor 36. Coupled to the gate electrode of transistor 36 is a diode 39 in parallel with a resistor 40. The gate electrode is coupled via a capacitor 41 to the output of the comparator 42. The diode 39, resistor 40 and capacitor 41 provide level shifting. The amplifier $A_1$, 45 operates as a differential amplifier and has the inverting input coupled to line 30 via resistor 46 with the noninverting input coupled to line 31 via resistor 47. Resistor 48 is coupled from the output of the amplifier 45 to the input, while resistor 49 is coupled from the non-inverting input to ground. Thus the amplifier 45 operates to sense the voltage across the subscriber line or across the load resistor 32 in a differential manner and converts the differential signal into a single ended output signal at its output terminal.

The output of amplifier 45 is coupled to the inverting input of amplifier 50 ($A_2$) via a series resistor 51. A resistor 52 also coupled to the inverting input has one terminal coupled to the input voltage $V_i$. A resistor 53 is coupled between the input and output of amplifier 50 while the series circuit of resistor 54 and capacitor 55 operate to shape the frequency of amplifier 50. Amplifier 50 operates as the summing junction while providing gain and frequency shaping. Thus the amplifier error signal $V_e$ is applied to the non-inverting terminal of the comparator 42. The comparator 42 has the inverting input coupled to the triangular waveform source as described in conjunction with FIG. 1. As indicated, the comparator 42 compares the error signal with the triangular waveform to produce the pulse width modulated signal at the output which signal is applied via capacitor 41 to the gate electrode of transistor 36.

The drain electrode of transistor 36 is coupled to a biasing source, while bias for amplifiers 45, 50 as well as the comparator are obtained from conventional DC supplies which may be in the range of 5 to 15 volts. As seen from FIG. 5, the output of amplifier 45 is a function of the differential voltage across the load resistor 32 as defined by the ratios of the resistors 48 to 46 and 49 to 47. These two ratios are chosen to be equal and matched to provide a good common mode performance for the amplifier. The values of resistors 46, 47, 48 and 49 are selected to be high impedance values to reduce power dissipation and to minimize the loading effect. The output voltage $V_0$ across the load resistor 32 can be much higher than the supply voltages which are the biasing voltages for the amplifiers 45 and 50. Therefore, the ratios of resistors 48 to 46 and 49 to 47 are selected so that the voltage at the input of amplifier 45 will not exceed its common mode range and that the output voltage will not be saturated. In fact, as will be described, the ratio of these resistors can be made frequency dependent in order to improve circuit performance. The output signal from amplifier 45 is a function of the voltage developed across resistor 32 and is added with $V_i$ at the input terminal of amplifier 50.

The output of amplifier 50 provides this amplified signal. The polarity of the output voltage of amplifier 45(vi) is opposite to $V_i$ due to negative feedback so that the sum provides a difference signal at the output of amplifier 50 which is the error signal $V_e$. The resistors 51, 52 and 53 are selected to provide the proper gain parameters for amplifier 50. The resistor 54 and capacitor 55 in conjunction with resistor 53 forms a lag-lead network which is used to shape the frequency response of the feedback loop to insure stability over the operating conditions.

As indicated, the error, signal $V_e$, is fed to the positive input of the comparator 42. A triangular waveform is fed to the negative input. The comparator 42 operates to compare the two signals to produce a pulse at the output having a width of $t_p$. The value of $t_p$ is dependent upon the error voltage $V_e$ such that larger error signals produce wider pulses. Essentially, the repetition rate of the triangular waveform is selected to be 512 KHz. Thus as can be ascertained, the comparator 42 functions as a pulse width modulator where the width of the pulse $t_p$ is directly proportional to the error signal produced. The pulse $t_p$ is capacitively coupled via capacitor 41 to the gate electrode of transistor 36. The time constant of capacitor 41 and resistor 40 is chosen to be large so as to maintain integrity of the pulse $t_p$. The diode 39 provides clamping action so that the pulse at the gate of transistor 36 is positive with respect to $V_b$ ($-48$ V) and thus provides a positive gate-to-source voltage to turn transistor 36 on, and allows current to flow in the primary of transformer 35 for the duration of the pulse. During this period ($t_p$), the diode 34 is back biased so that the energy is stored in the transformer via the primary winding. At the end of $t_p$, transistor 36 is turned off and current can no longer flow in the transistor. Thus the diode 34 conducts and energy is transferred to capacitor 35 for the period of $T-t_p$ due to the flyback action.

The operation of the flyback converter is well known and has been explained above.

Figure 6:
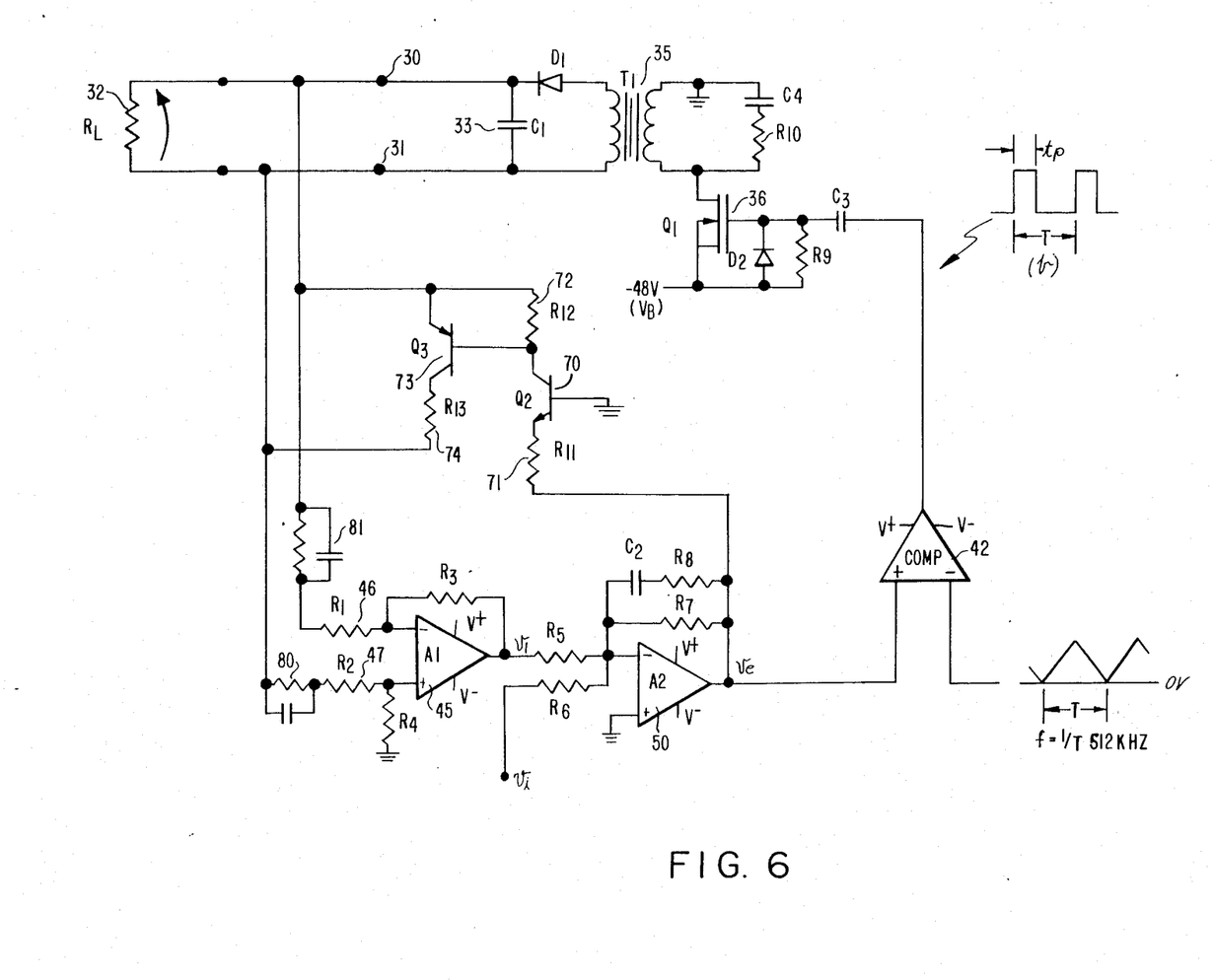
FIG. 6 is a detailed schematic diagrm depicting the amplifier shown in FIG. 4.

Referring to FIG. 6, there is shown the amplifier circuit of FIG. 5 which further includes the slew rate enhancer circuitry as briefly explained above in conjunction with FIG. 4. The operation of the remaining components in FIG. 6 is according to that described in conjunction with FIG. 5, and therefore, for these common components, the same reference numerals have been retained. In any event, as seen in FIG. 6, the output of amplifier 50 is coupled to the emitter electrode of transistor 70 having its base electrode connected to ground. The error signal $V_e$ is coupled to the emitter electrode of transistor 70 via resistor 71. The collector electrode is coupled to subscriber line 30 via a resistor 72 with the collector electrode of transistor 70 further coupled to the base electrode of transistor 73 having its emitter electrode coupled to subscriber line 30. The collector electrode of transistor 73 is coupled via resistor 74 to the subscriber line 31. Thus, as will be explained, transistor 70, in conjunction with resistors 71 and 72, operates as the level shifter while transistor 73, in conjunction with resistor 74, operates as the slew rate enhancer. The circuit functions as follows. The slew rate enhancer is designed to operate only when the energy stored in capacitor 33 exceeds the demand of the load resistor 32. The existence of this condition is manifested when the error voltage $V_e$ is negative. As $V_e$ reaches about $-0.6$ V, transistor 70 starts to conduct and in turn transistor 73 begins to conduct. This operation in effect places an additional load across capacitor 33 which, therefore, will speed up the removal of energy. As $V_e$ tends to become more negative, transistor 73 will conduct harder and increase the removal of energy from capacitor 33. When equilibrium is reached, that is when the incremental energy demands by the load resistor 32 equals the incremental energy received by the capacitor, the error signal $V_e$ will become positive. When the error signal becomes positive, the slew rate enhancer circuit is disabled.

Also shown in FIG. 6 are two additional RC networks 80 and 81 which are placed in series with resistors 46 and 47. Essentially, the RC networks 80 and 81 operate to make the feedback factor elements frequency dependent. This is done by splitting the magnitude of resistors 46 and 47 as selected in FIG. 5 into two resistors each and adding shunt capacitors across each of the split resistors as shown in FIG. 6. This modification permits an additional degree of freedom for optimizing circuit performance. The dotted line shown in FIG. 3 and in conjunction with curve 6 represents the frequency characteristic of the amplifier with this modification.

From the above noted description, there has been described an amplifier which uses a flyback converter as an intrinsic element in the design. The flyback converter has the energy storing capacitor coupled across the line and controlled by means of a diode which is coupled to the secondary of the flyback transformer. The line impedance or load impedance of the subscriber line operates as an element for the amplifier to thereby control the gain and frequency response. Thus a dominant pole of the amplifier is formed by the subscriber load impedance and the storage capacitor of the amplifier. The flyback converter is controlled by a pulse width modulator which operates at a high frequency which is greater than 512 KHz. In this manner, the requirements for the flyback transformer are such that it can be an extremely small and compact component. The amplifier enables ringing voltage as well as DC talk to be supplied to the line, while the isolation provided assures reliable operation against normal transients which would adversely affect prior art components.

What is claimed:

1. A wide-band, high voltage amplifier for use in a subscriber line circuit for supplying wide-band output signals to a two-wire line, said line characterized in exhibiting a determinable load impedance, comprising:

a flyback converter amplifier means including a storage capacitor coupled across said two-wire line, a transformer with primary and secondary windings, with said secondary winding coupled via a unidirectional conducting device to said storage capacitor, and switching means coupled in series with said primary winding;

means coupled across said capacitor to provide an output signal indicative of the signal across said capacitor;

summing means having one input responsive to said output signal indicative of said signal across said capacitor and another input responsive to wide-band input signals for application to said line, an output of said summing means providing an error signal indicative of the difference in said two signals applied to said inputs;

modulator means having one input responsive to said error signal and another input responsive to a repetitive reference signal to provide at an output a repetitive pulse signal having a pulse width indicative of the magnitude of said error signal, said repetitive reference signal being a triangular signal having a frequency rate of at least 512 KHz, said summing means further including amplifier means operative to provide a gain frequency characteristic to said error signal prior to applying same to said modulator means, said modulator also including a comparator having one input responsive to said error signal and another input responsive to said repetitive reference signal to provide a pulse width modulated signal; and means for applying said repetitive pulse signal to said switching means to cause said flyback converter to transfer energy to said capacitor according to the magnitude of said error signal as manifested by the width of said pulse signal, whereby said wide-band, high voltage amplifier is responsive to input signals having a wide frequency range for providing wide-band output signals, for the line circuit, having a wide frequency range and a wide amplitude range.

2. The wide-band, high voltage amplifier according to claim 1, wherein said switching means coupled in series with said primary winding includes a field effect transistor having the source to drain electrode path coupled in series with one terminal of said primary winding and a gate control electrode coupled to the output of said modulator means, with said primary winding further coupled to a source of potential.

3. The wide-band, high voltage amplifier according to claim 1, wherein said means coupled across said capacitor comprises a differential amplifier having one input coupled to one of said lines and the other input coupled to the other of said lines to provide at an output a single ended signal.

4. The wide-band, high voltage amplifier according to claim 1, wherein said storage capacitor and said impedance of said two-wire line constitute a dominant pole in the frequency response characteristic of said wide band, high voltage amplifier.

5. A wide-band, high voltage amplifier as described as in claim 1, wherein the flyback converter amplifier means has a transfer function controlled by the load impedance of said two-wire line.

6. A wide-band, high voltage amplifier as described in claim 1, wherein the flyback converter amplifier means has a transfer function $G_2$ determined by the formula:

$$G_2 = \frac{V_o}{t_p} = \left( \frac{\alpha}{2} \frac{R_L}{T \cdot L_p} \right)^{\frac{1}{2}} \cdot V_B$$

where $\alpha$ is a constant efficiency factor of said flyback converter amplifier means, $R_L$ is the load impedance of the two-wire line, $L_P$ is the inductance of the primary winding of the transformer, T is the repetition rate of the repetitive pulse signal, $V_B$ is a voltage applied to the primary winding of the transformer, $V_o$ is the voltage across $R_L$ and $t_p$ is said pulse width.

7. A wide-band, high voltage amplifier as described in claim 1, wherein the means coupled across said capacitor, the summing means, the means for applying said repetitive pulse signal, and the modulator means are all formed in a low voltage integrated circuit and the flyback converter amplifier means is formed of discrete high voltage components.

8. A wide-band, high voltage amplifier particularly adapted for supplying wide-band output signals to a two-wire telephone line having a determinable load impedance which varies as a function of the length of said line, said wide-band high voltage amplifier comprising:

a flyback converter amplifier means including a storage capacitor coupled across said line, a transformer having a primary and a secondary winding with said secondary winding coupled via a diode to said storage capacitor, with said primary winding in series with switching means to transfer energy from said primary winding to said capacitor via said secondary winding;

first means responsive to the voltage across said capacitor to provide a signal indicative of said voltage;

second means for summing said signal from said first means with a wide-band input signal to be applied to said line, to provide at an output an error signal indicative of the difference between said signal from said first means and said wide-band input signal, said second means for summing including an operational amplifier having an input for summing said signal from said first means with said wide-band input signal, and including means coupled to said amplifier for shaping the frequency response of said amplifier;

comparator means for comparing the error signal to a repetitive reference signal to provide at an output a control signal, said repetitive reference signal as applied to said comparator is a triangular waveform for causing said comparator to provide at an output a pulse width modulated control signal having a pulse duration according to the magnitude of said error signal; and means for applying said control signal to said switching means for operating said switching means according to said control signal to thereby transfer energy to said storage capacitor according to the characteristics of said control signal, said switching means in series with said primary winding including a field effect transistor having the source to drain path coupled in series with said primary winding and having a gate electrode coupled to the output of said comparator said gate electrode being coupled to said output of said comparator via a capacitor, and said wide-band, high voltage amplifier further including means coupled to said gate electrode for clamping said control signal whereby said wide-band, high voltage amplifier is responsive to input signals having a wide frequency range for providing output signals, for the line circuit, having a wide frequency range and a wide amplitude range.

9. The wide-band, high voltage amplifier according to claim 8, wherein said first means includes a differential amplifier coupled across said capacitor to provide a single ended signal at the output.

10. The wide-band, high voltage amplifier according to claim 9, wherein said inputs of said differential amplifier are coupled to said capacitor via a frequency dependent impedance.

11. The wide-band, high voltage amplifier according to claim 8, wherein the magnitude of said load impedance of said line and said magnitude of said storage capacitor form a dominant pole for said wide-band high voltage amplifier.

12. A wide-band, high voltage amplifier as described in claim 8, wherein the flyback converter amplifier means has a transfer function controlled by the load impedance of said two-wire line.

13. A wide-band, high voltage amplifier as described in claim 8, wherein the flyback converter amplifier means has a transfer function $G_2$ determined by the formula:

$$G_2 = \frac{V_o}{t_p} = \left(\frac{\alpha}{2} \frac{R_L}{T \cdot L_p}\right)^{\frac{1}{2}} \cdot V_B$$

where $\alpha$ is a constant efficiency factor of said flyback converter amplifier means, $R_L$ is the load impedance of the two-wire line, $L_P$ is the inductance of the primary winding of the transformer, T is the repetition rate of the repetitive reference signal, $V_B$ is a voltage applied to the primary winding of the transformer, $V_o$ is the voltage across $R_L$ and $t_p$ is said pulse duration.

14. A wide-band, high voltage amplifier as described in claim 8, wherein the first means, the second means, the comparator means, and the means for applying are all formed in a low voltage integrated circuit and the flyback converter amplifier means is formed of discrete high voltage components.

15. A wide-band, high voltage amplifier for supplying wide-band output signals to a defined load impedance, comprising:

a flyback converter amplifier means including a storage capacitor coupled across said load impedance, a transformer with primary and secondary windings, with said secondary winding coupled via a unidirectional conducting device to said storage capacitor, and switching means coupled in series with said primary winding;

means coupled across said capacitor to provide an output signal indicative of the signal across said capacitor;

summing means having one input responsive to said output signal indicative of the signal across said capacitor and another input responsive to wide-band input signals for application to said load impedance, an output of said summing means providing an error signal indicative of the difference in said two signals applied to said inputs;

level shifting means coupled to the output of said summing means and operative to provide an output signal which varies in amplitude in accordance with a given range of error signals;

slew rate enhancing means coupled across said storage capacitor and responsive to the output signal from said level shifting means to control the energy transferred from said storage capacitor during said given range of error signals;

modulator means having one input responsive to said error signal and another input responsive to a repetitive reference signal to provide at an output a repetitive pulse signal having a pulse width indicative of the magnitude of said error signal; and means for applying said repetitive pulse signal to said switching means to cause said flyback converter to transfer energy to said capacitor according to the magnitude of said error signal as manifested by the width of said pulse signal, whereby said wide-band, high voltage amplifier is responsive to input signals having a wide frequency range for providing wide-band, high voltage output signals.

16. A wide-band, high voltage amplifier adapted for supplying wide-band output signals to a defined load impedance, comprising:

a flyback converter amplifier means including a storage capacitor coupled across said load, a transformer having a primary and a secondary winding with said secondary winding coupled via a diode to said storage capacitor, with said primary winding in series with switching means to transfer energy from said primary winding to said capacitor via said secondary winding;

first means responsive to the voltage across said capacitor to provide a signal indicative of said voltage;

second means for summing said signal from said first means with a wide-band input signal to be applied to said load, to provide at an output an error signal indicative of the difference between the signal from said first means and said wide-band input signal;

level shifting means coupled to the output of said second means and operative to provide and output signal which varies in amplitude in accordance with a given range of error signals;

slew rate enhancing means coupled across said storage capacitor and responsive to said output signal from said level shifting means to control the energy transferred from said storage capacitor during said given range of error signals;

comparator means for comparing the error signal to a repetitive reference signal to provide at an output a control signal; and means for applying said control signal to said switching means for operating the switching means according to said control signal to thereby transfer energy to said storage capacitor according to the characteristics of said control signal, whereby said wide-band, high voltage amplifier is responsive to input signals having a wide frequency range for providing wide-band, high voltage output signals.

* * * * *